(12) United States Patent
Ang

(10) Patent No.: US 6,424,630 B1
(45) Date of Patent: Jul. 23, 2002

(54) APPARATUS AND METHOD FOR CALIBRATING A HOME NETWORKING STATION RECEIVING NETWORK SIGNALS ON A TELEPHONE LINE MEDIUM

(75) Inventor: Boon-Aik Ang, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/182,524

(22) Filed: Oct. 30, 1998

(51) Int. Cl.$^7$ ................................................. H04L 1/00
(52) U.S. Cl. ........................................ 370/251; 370/252
(58) Field of Search ................................ 714/712–717; 370/247, 251, 252, 470; 379/9.06, 6, 22, 14, 12, 16, 22.08, 23, 26.01, 29.03, 29.08

(56) References Cited

U.S. PATENT DOCUMENTS 3,392,442 A    7/1968   Napier et al.

(List continued on next page.)

FOREIGN PATENT DOCUMENTS

EP         0215557 A2    3/1987

(List continued on next page.)

OTHER PUBLICATIONS

M. Matsudo et al., "A Raise in Solder Temperature for Flip Chip Bump Contacts", The institute Of Electrical Engineers, Stevenage, GB, Nov. 199, Database Accession No. 4684141, XP000956490. (Abstract). (1993).

(List continued on next page.)

*Primary Examiner*—Salvatore Cangialosi

(57) ABSTRACT

A physical layer transceiver of a home network station connected to a telephone medium has an architecture enabling adaptation of detection circuitry based on received network signals to enable reliable recovery of data signals. The physical layer transceiver includes an input amplifier that amplifies network signals according to one of 128 gain settings set by a receiver gain control signal. A signal conditioning circuit includes an envelope detector configured for outputting an envelope of the amplified received signal, and an energy detector configured for outputting an energy signal of the amplified received signals. The envelope signal and the energy signal are supplied to slicer threshold circuits, configured for outputting noise, peak, data event and energy event signals based on noise threshold, peak threshold, data transition threshold, and energy threshold signals, respectively. A digital controller controls the input amplifier gain and the threshold values, and adjusts the gain and threshold values based on the noise event signal and the peak event signal within an access ID (AID) interval. The physical layer transceiver also includes a calibration circuit for calibrating a common mode voltage reference signal in the physical layer transceiver to a minimum noise threshold level while isolating any network signals from the physical layer transceiver. The common mode voltage signal is initially set at a maximum value and supplied to the noise slicer threshold circuit. The common mode voltage signal is successively decreased until the common mode voltage signal falls below the minimum noise slice threshold. The calibrated value corresponds to the common mode voltage signal configuration setting at the time the noise slicer threshold circuit transitions from a 1 to a zero. Calibration insures that the baseline of the envelope signal is within 20 millivolts of the minimum noise slicer threshold during operation.

21 Claims, 9 Drawing Sheets

U.S. PATENT DOCUMENTS

| | | | | |
|---|---|---|---|---|
| 3,965,418 A | * | 6/1976 | Bauer et al. | 379/22 |
| 3,970,795 A | * | 7/1976 | Allen | 370/252 |
| 4,112,264 A | * | 9/1978 | Abramson et al. | 714/712 |
| 5,798,563 A | | 8/1998 | Feilchenfeld et al. | |
| 5,881,130 A | * | 3/1999 | Zhang | 379/29.03 |
| 6,084,958 A | * | 7/2000 | Blossom | 379/352 |
| 6,097,732 A | * | 8/2000 | Jung | 370/470 |

FOREIGN PATENT DOCUMENTS

| | | |
|---|---|---|
| EP | 0446666 A3 | 9/1991 |
| EP | 0560276 A3 | 9/1993 |

OTHER PUBLICATIONS

R. Alarashi et al., "Evaluation of Electronic Transport and Premature Failure in the Melt–Spun Pb–Sn–Sb–Ag Rapidly Solidifed Alloys", Materials Letters, NL, North Holland, vol. 31, No. 1–2, May 1, 1997, pp. 61–65, XP004112698, (1997).

M. Colet et al., "Constant Strain Rate Tensile Properties of Various Led Based Solder Alloys at 0, 50, and 100°C ", The Institute Of Electrical Engineers, Stevenage, GB, Oct. 1, 1992, Database Accession No. 4284950, XP000956499. (Abstract).

* cited by examiner

APPARATUS AND METHOD FOR CALIBRATING A HOME NETWORKING STATION RECEIVING NETWORK SIGNALS ON A TELEPHONE LINE MEDIUM

FIELD OF THE INVENTION

The present invention relates to network interfacing, and more particularly, to methods and systems for calibrating physical layer transceivers configured for receiving network signals carrying data between network stations connected to a telephone line.

DESCRIPTION OF THE RELATED ART

Local area networks use a network cable or other media to link stations on the network. Each local area network architecture uses a media access control (MAC) enabling network interface cards at each station to share access to the media.

Conventional local area network architectures use media access controllers operating according to half-duplex or full duplex Ethernet (ANSI/IEEE standard 802.3) protocol using a prescribed network medium, such as 10 BASE-T. Newer operating systems require that a network station to be able to detect the presence of the network. In an Ethernet 10 BASE-T environment, the network is detected by the transmission of a link pulse by the physical layer (PHY) transceiver. The periodic link pulse on the 10 BASE-T media is detected by a PHY receiver, which determines the presence of another network station transmitting on the network medium based on detection of the periodic link pulses. Hence, a PHY transceiver at Station A is able to detect the presence of Station B, without the transmission or reception of data packets, by the reception of link pulses on the 10 BASE-T medium from the PHY transmitter at Station B.

Efforts are underway to develop an architecture that enables computers to be linked together using conventional twisted pair telephone lines instead of established local area network media such as 10 BASE-T. Such an arrangement, referred to herein as a home network environment, provides the advantage that existing telephone wiring in a home may be used to implement a home network environment. However, telephone lines are inherently noisy due to spurious noise caused by electrical devices in the home, for example dimmer switches, transformers of home appliances, etc. In addition, the twisted pair telephone lines suffer from turn-on transients due to on-hook and off-hook and noise pulses from the standard POTS telephones, and electrical systems such as heating and air conditioning systems, etc.

An additional problem in telephone wiring networks is that the signal condition (i.e., shape) of a transmitted waveform depends largely on the wiring topology. Numerous branch connections in the twisted pair telephone line medium, as well as the different associated lengths of the branch connections, may cause multiple signal reflections on a transmitted network signal. Telephone wiring topology may cause the network signal from one network station to have a peak-to-peak voltage on the order of 10 to 20 millivolts, whereas network signals from another network station may have a value on the order of one to two volts. Hence, the amplitude and shape of a received pulse may be so distorted that recovery of a transmit clock or transmit data from the received pulse becomes substantially difficult.

Hence, a physical layer transceiver for a home network environment must be able to precisely detect, amplify, and decode the network signal with precise signal processing circuitry. However, implementation of a physical layer transceiver in silicon results in additional problems related to the accuracy and precision of the receiver circuitry. In particular, uncertainties in process variations during manufacture may be a potential source for offset errors between independent circuits in the physical layer receiver, consequently effecting the detection of the smaller network signals having peak to peak voltages on the order of 10 to 20 millivolts.

SUMMARY OF THE INVENTION

There is a need for a network station having a physical layer transceiver capable of reliably recovering data from a received network signal on a telephone line medium.

There is also a need for a network station capable of self-calibrating its physical layer receiver circuitry to minimize errors due to process variations during manufacturing.

There is also a need for an arrangement in a physical layer transceiver for selectively calibrating a receiver by determining an optimum common mode voltage signal relative to minimum noise thresholds.

There is also a need for an arrangement in a physical layer transceiver that enables efficient calibration of signal generator circuits having matched circuit design and layout structures.

These and other needs are obtained by the present invention, where a physical layer transceiver in a network station is configured for automatically calibrating a receiver circuit based on a correlation between a common mode voltage signal having a selected value, and a predetermined noise threshold. The common mode voltage signal is supplied to the receiver circuit, and a comparison is made between the common mode voltage signal and the prescribed noise threshold. The common mode voltage signal is selectively set to a calibrated value based on the determined presence of an event where the common mode voltage signal falls below the prescribed noise threshold.

According to one aspect of the present invention, a method of calibrating a physical layer transceiver, configured for receiving network signals from a telephone line medium, includes generating in a common mode voltage generator a common mode voltage signal having an initial maximum value, and supplying the common mode voltage signal to a receiver circuit configured for processing the network signals from the telephone line medium according to the common mode voltage signal. The receiver circuit includes a noise comparator configured for generating a noise comparison signal based on an input signal exceeding a prescribed noise threshold. The method further includes determining a presence of an event where the common mode voltage signal falls below the prescribed noise threshold as the input signal, and selectively setting the common mode voltage signal to a calibrated value based on the determined presence of the event. The generation of the common mode voltage signal having an initial maximum value provides an efficient arrangement for determining where the common mode voltage signal falls below the prescribed noise threshold, since the common mode voltage signal can be successively reduced until the common mode voltage signal falls below the prescribed noise threshold, indicating that the common mode voltage signal can be set to the calibrated value. The calibrated value thus provides an optimum common mode voltage signal for use in the receiver circuit for processing the network signals. Moreover, the determining of the event where the common mode voltage signal falls below the prescribed noise threshold as the input signal provides precise calibration relative to an internallycontrolled signal, without introducing any variations that may be otherwise encountered by using an external reference signal during calibration.

Another aspect of the present invention provides a physical layer transceiver configured for receiving network signals from a telephone line. The physical layer transceiver includes a digital to analog (D/A) converter for selectively generating a noise threshold signal based on a supplied threshold value, a common mode signal generator for selectively generating a common mode voltage signal in response to a common mode selection signal, and a receiver circuit configured for processing network signals from the telephone line medium according to the common mode voltage signal. The receiver circuit includes a noise comparator configured for generating a noise comparison signal in response to an input signal exceeding the noise threshold signal. The physical layer transceiver also includes a calibration control circuit configured for determining a calibration setting for the common mode signal generator based on the noise comparison signal, the calibration circuit setting the common mode selection signal to an initial maximum setting and selectively reducing the common mode selection signal to the calibration setting based on a determined presence of a transition in the noise comparison signal relative to the minimum noise threshold signal.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
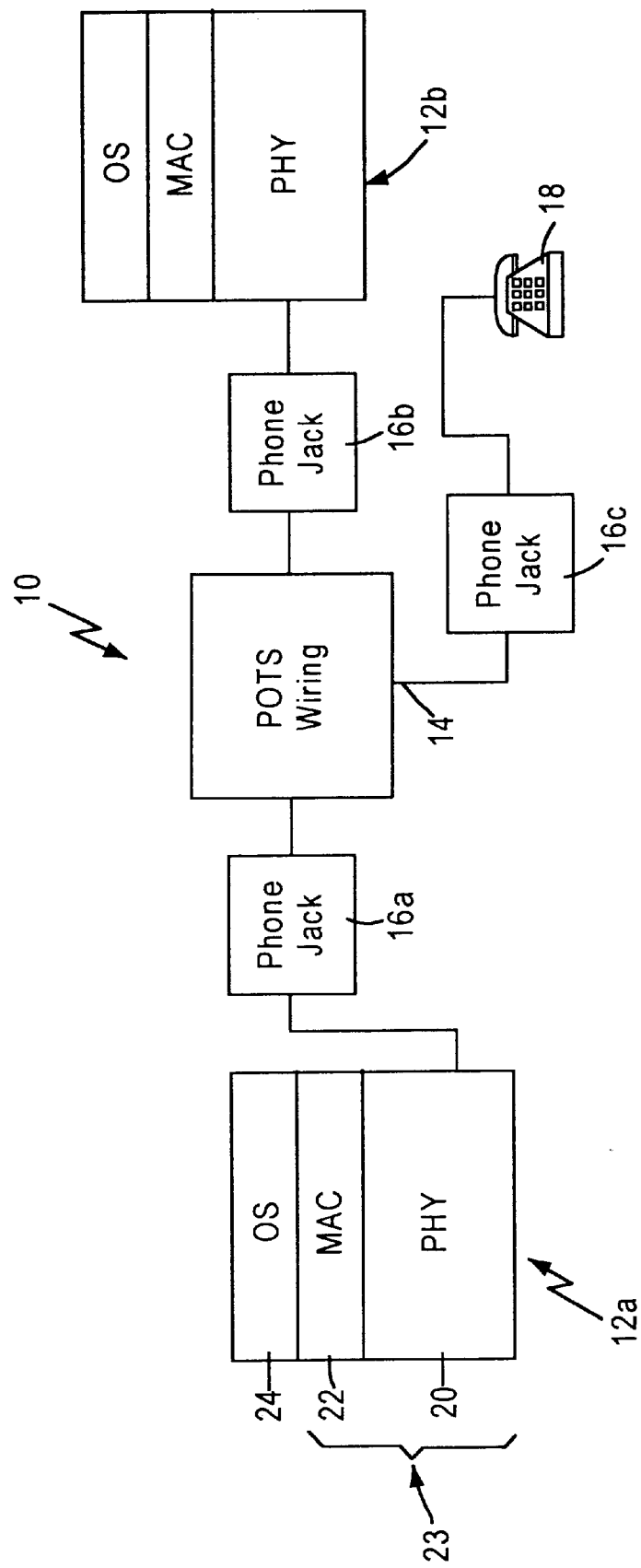
FIG. 1 is a block diagram illustrating a local area network deployed over residential twisted pair wiring.

FIG. 1 is a diagram of an Ethernet (IEEE 802.3) local area network 10 implemented in a home environment using twisted pair network media according to an embodiment of the invention. As shown in FIG. 1, the network 10 includes network stations 12a and 12b that are connected to a telephone line (twisted pair) wiring 14, via RJ-11 phone jacks 16a and 16b respectively. A telephone 18 connected to the RJ-11 phone jack 16c may continue to make phone calls while stations 12a and 12b are communicating.

As shown in FIG. 1, each network station 12, for example a personal computer, printer, or intelligent consumer electronics device, includes a physical layer (PHY) transceiver 20, a media access (MAC) layer 22, and an operating system (OS) layer that performs higher layer function according to the OSI reference model.

Figure 2A:
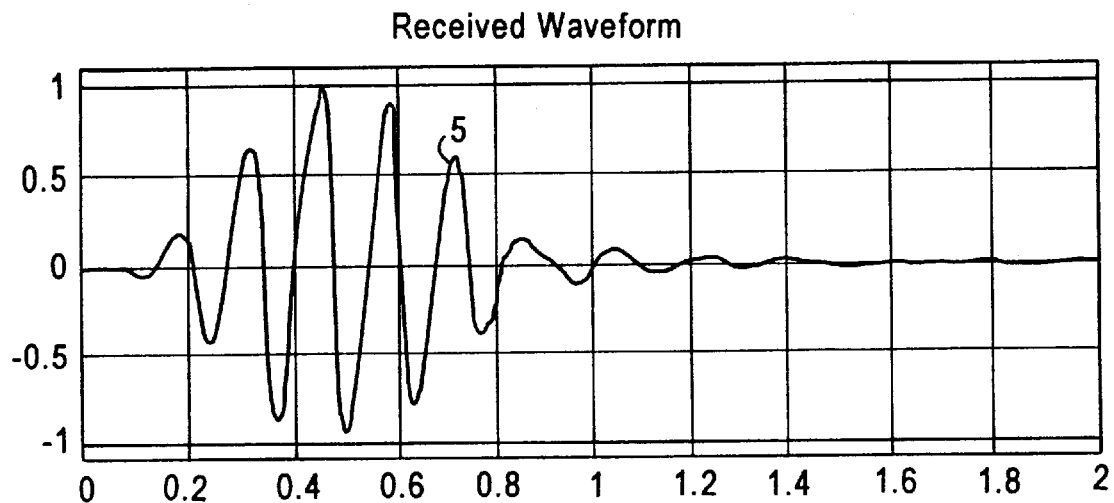
FIGS. 2A, 2B, 2C and 2D are diagrams illustrating processing of received waveforms by the physical layer transceiver of FIG. 1 according to an embodiment of the present invention.
Figure 2B:
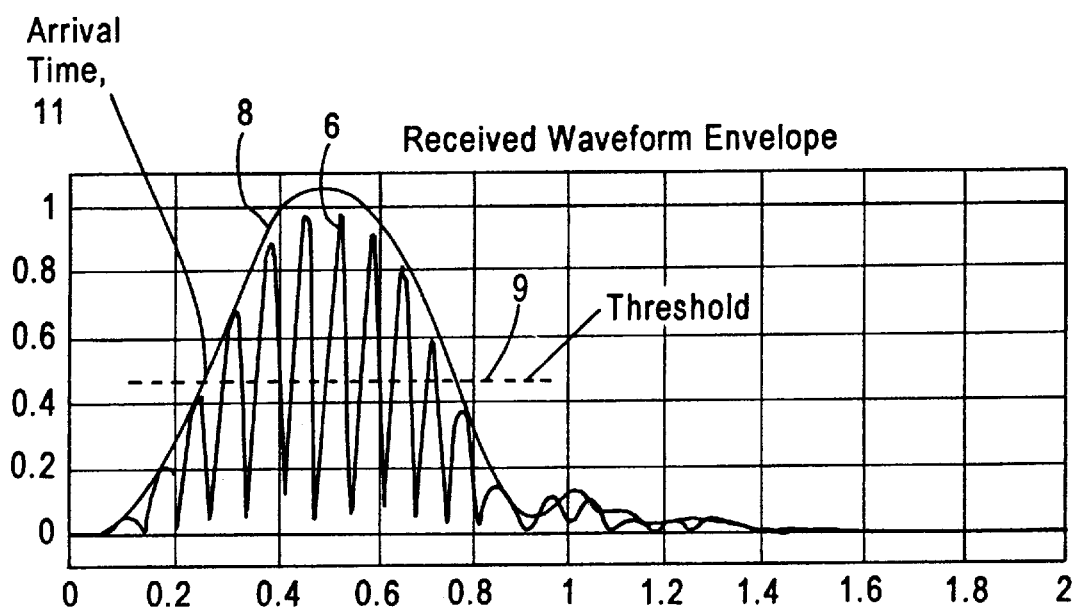

The stations 12a and 12b communicate by transmitting band limited pulses that carry network data modulated in the analog network signals. In particular, the physical layer transmitter transmits a band limited pulse 5, illustrated in FIG. 2A. The arrival position of a received pulse is detected using a waveform envelope 8 representing the absolute value 6 of the received signal, shown in FIG. 2B. The envelope 8 is supplied to a slicing circuit described below, having a threshold level 9 selected to identify the arrival position 11 of the received pulse. When the envelope 8 crosses the threshold level 9, the slicing circuit detects the arrival position 11 of the pulse as an event representing a data pattern. This event can be used to recover a transmit clock and transmit data from the received signal.

Figure 2C:
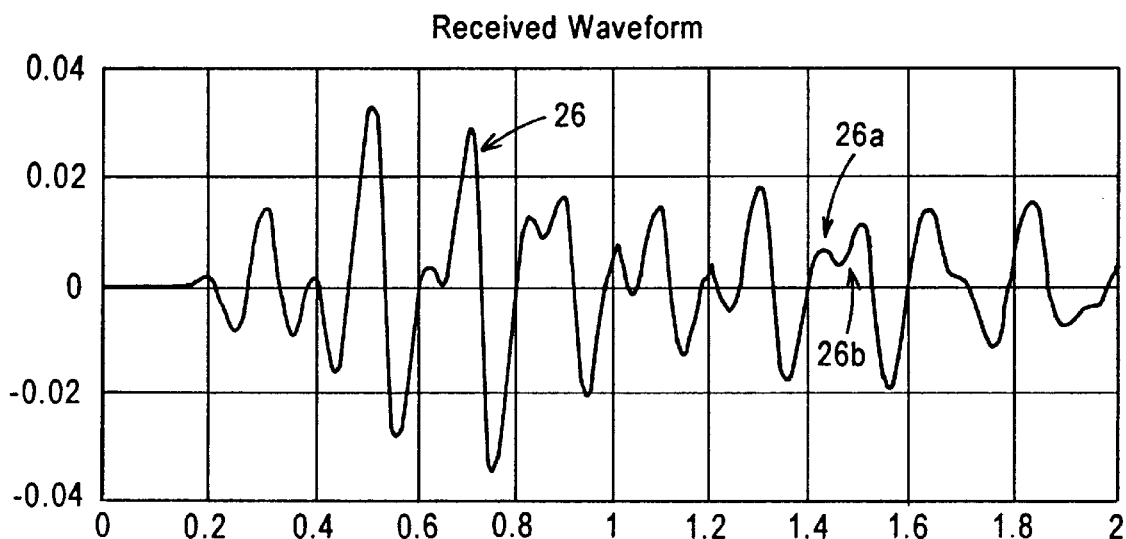
Figure 2D:
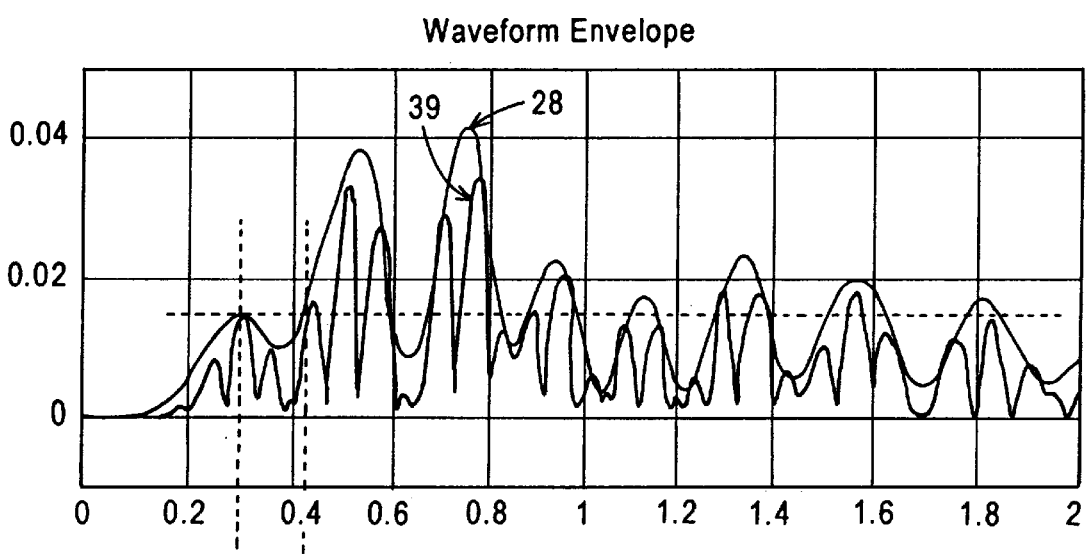

However, in telephone wire networks, the received envelope waveform depends largely on the wiring topology. As the wiring topology may cause multiple signal reflections, the shape of a received pulse may be so distorted that the envelope may have multiple localized maximum points. In addition, the wiring topology in the home network is variable. Hence the distortion of the received pulse is unpredictable, resulting in a waveform 26 as shown in FIG. 2C. As shown in FIG. 2C, the distorted waveform 26 of a received pulse signal has multiple localized maximum and minimum points 26a and 26b due to wiring topology. FIG. 2D illustrates the envelope waveform 28 of the distorted waveform 26. Hence, if a threshold value is not properly set for detection of a data pulse, a slicing circuit may identify multiple pulse positions at which crosses a threshold level. As a result, a unique time value for the position of a received pulse may not be detected resulting in data recover errors.

According to the disclosed embodiment, an adaptive physical layer transceiver architecture adaptively adjusts the signal processing circuitry on the receive side and transmit side to optimize accurate recovery data from the transmitted network signals. In particular, the disclosed physical layer transceiver includes a calibration circuit optimized for correlating a common mode signal, used as a reference voltage in the receiver circuitry, to a noise threshold signal. As described, below, the common mode signal is selectively adjusted relative to the noise threshold signal to optimize receiver operations relative to the noise threshold signal. Hence, uncertainties in process variations are resolved, enabling a signal resolution of 20 millivolts within the receiver circuitry. An overview of the physical layer transceiver architecture will first be provided, followed by a description of the arrangement for calibrating the physical layer transceiver.

Physical Layer Architecture Overview

Figure 3:
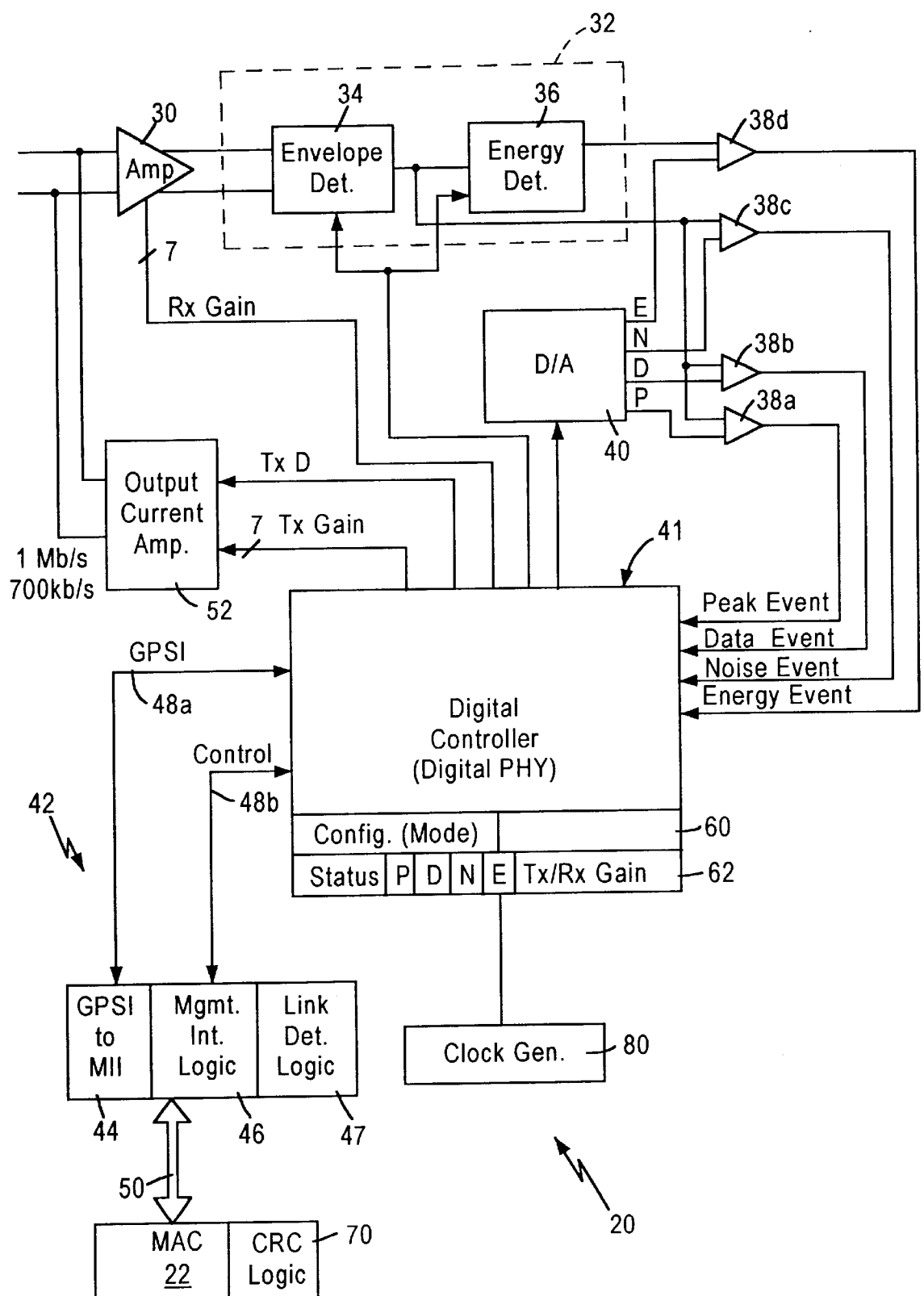
FIG. 3 is a block diagram illustrating the architecture of the physical layer transceiver of FIG. 1 according an embodiment of the present invention.

FIG. 3 is a block diagram of the physical layer transceiver 20 according to an embodiment of the present invention. As shown in FIG. 3, the physical layer transceiver 20 includes an input amplifier 30 for amplifying analog network received from the telephone medium, such as the network signals shown in FIG. 2C. As described below, the input amplifier 30 has a variable gain controlled by a 7-bit gain signal (RxGain) for amplifying received network signals. The physical layer transceiver 20 also includes a signal conditioning circuit 32 that includes an envelope detection circuit 34 and an energy detection circuit 36. The envelope detection circuit 34 generates the envelope signal 28 in response to the amplified received signal 26. For example, the envelope detector 34 includes an absolute value circuit (e.g., a rectifier circuit) that generates an absolute value signal 39 of the amplified received signal 26, and a low pass filter coupled to the rectifier circuit for filtering out high-frequency components the rectified signal, resulting in the envelope signal 28. The envelope signal 28 is output from the envelope detector 34 and supplied to the energy detector 36. The energy detector 36 includes an integrator which performs the mathematical process of integration over time to produce a signal proportional to energy of the received pulse signal.

As shown in FIG. 3, physical layer transceiver 20 also includes a plurality of slicer circuits 38, and a digital to analog converter 40c for supplying analog threshold signals to the slicer circuits 38. The physical layer transceiver also includes a digital controller 41 configured for controlling the digital analog converter 40c for outputting the threshold signal E, N, D, P, described below.

In particular, the digital controller 41 is configured for controlling the threshold values applied to the slicers 38a, 38b, and 38d based on the signals supplied by the slicers 38 to the digital controller 41. In particular, slicer circuit 38a outputs a peak event signal indicating with respect to time whether the envelope signal 28 exceeds a peak threshold (P) supplied by the digital to analog converter 40c under the control of the digital controller 41. Slicer circuits 38b and 38c output data event signals and noise event signals indicating with respect to time whether the envelope signal 28 exceeds a data transition threshold (D) and a noise threshold (N) respectively. The slicer circuit 38d outputs an energy event signal indicating with respect to time whether the energy signal output by energy detector 36 exceeds an energy threshold (E) supplied by the D/A converter 40c.

Hence, the slicer circuits 38a, 38b, and 38c output peak, data transition, and noise event signals indicating with respect to time whether the envelope signal 28 exceeds a peak threshold (P), a data transition threshold (D), and a noise threshold (N), respectively. Slicer 38d, however, outputs an energy event signal indicating with respect to time whether the energy signal from the energy detector 36 exceeds an energy threshold (E).

The digital controller 41 controls the noise, peak and data transition thresholds based on the noise event signals and the peak signals output by the slicers 38c and 38a, respectively, and outputs digital data signals to the media access controller 22 via a media independent interface (MII) 50 based on either the energy event signals or the data event signals.

In particular, the digital controller 41 adjusts the gain of the amplifier 30, and the threshold values P, D, N, and E generated by the D to A converter 40c during an access ID (AID) interval. AID is a specific identifier which is unique for each network station 12. AID is a series of 8 pulses output from the PHY transceiver 20 of the transmitting station onto the telephone medium 14, where the time intervals between the first pulse and the successive 7 pulses define respective values. For example, assume a second pulse is output by the PHY transceiver 20 following a first pulse at time T1. If T1 equals 66 clock cycles (assuming a 116 nanosecond clock), the corresponding value is 00; if T1 equals 86, 106, or 126 clock cycles, the values are 01, 10, or 11, respectively, where the maximum interval between pulses is 128 clock cycles. The same arrangement is used to detect the values used in time intervals T2, T3, T4, T5, and T7. Hence, the presence of the valid AID can be determined by detecting a first pulse, and detecting a presence of 7 successive pulses using detection windows each having a duration of 128 clock cycles.

According to the disclosed embodiment, AID replaces the preamble conventionally used in 10 Base-T Ethernet (IEEE 802.3) systems. Hence, the digital controller 41 of the present invention uses the AID interval to selectively tune the input amplifier 30 to one of 128 different gain settings selected by the RxGain signal, and set the threshold values used by the slicer circuits 38 by supplying digital threshold values to the D/A converter 40c. Once the digital controller 41 has tuned the input amplifier 30 and the threshold values of the slicer circuits 38, the digital controller 41 uses either the data transition event signals from the slicer circuit 38b or the energy event signal from the slicer circuit 38d for recovering the data signals, described below.

The physical layer transceiver also includes a transmitter portion 52 (e.g., an output current amplifier), that converts transmit data (TxD) to an analog network signal. The analog network signal is output at a selected one of 128 output gain values based on the 7-bit transmit gain (TxGain) signal output by the digital controller 41.

As shown in FIG. 3, the physical layer transceiver 20 also includes an output interface 42 including an MII to general purpose serial interface (GPSI) converter 44, management interface logic 46, and buses 48a and 48b. The bus 48a transfers transmit and receive data between the MAC 22 and the digital controller 41 in GPSI format. The converter 44 converts the GPSI format data to nibble-wide data for transfer to the MAC 22 via the MII 50. Similarly, transmit data from the MAC 22 supplied via the MII 50 is converted from nibble-wide data to GPSI format, and supplied to the digital controller 41 via the GPSI data bus 48a.

The output interface 42 also includes a control data bus 48b for transferring configuration data and status information between the digital converter 41 and the management interface logic 46. In particular, the management interface logic 46 is configured for storing configuration data, received from the MAC 22 via the MII 50, into the digital controller 41 at selected control registers 60. Note that the threshold value E for the energy detector slicer circuit 38d may be supplied by the management agent via the MII 50 and set in the configuration registers 60. The digital controller 41 also includes status registers 62 that include, for example, the threshold values for the threshold signals P, D, and E, and the 7-bit input and output amplifier gain control signals (RxGain, TxGain). Hence, a management agent (e.g., a link controller, described below) can access registers 60 and 62 for reading and writing of control information, and reading status information from the status registers 62. The interface 42 also includes link detection logic 47 for determining whether a valid link is detected on the network medium 14. If no valid AID is detected within a detection interval, having a preferred duration of about 800 milliseconds, the link status is sent to an invalid state. A valid AID may be either from a link packet or a data packet.

Calibrating the Physical Layer Transceiver

Figure 4:
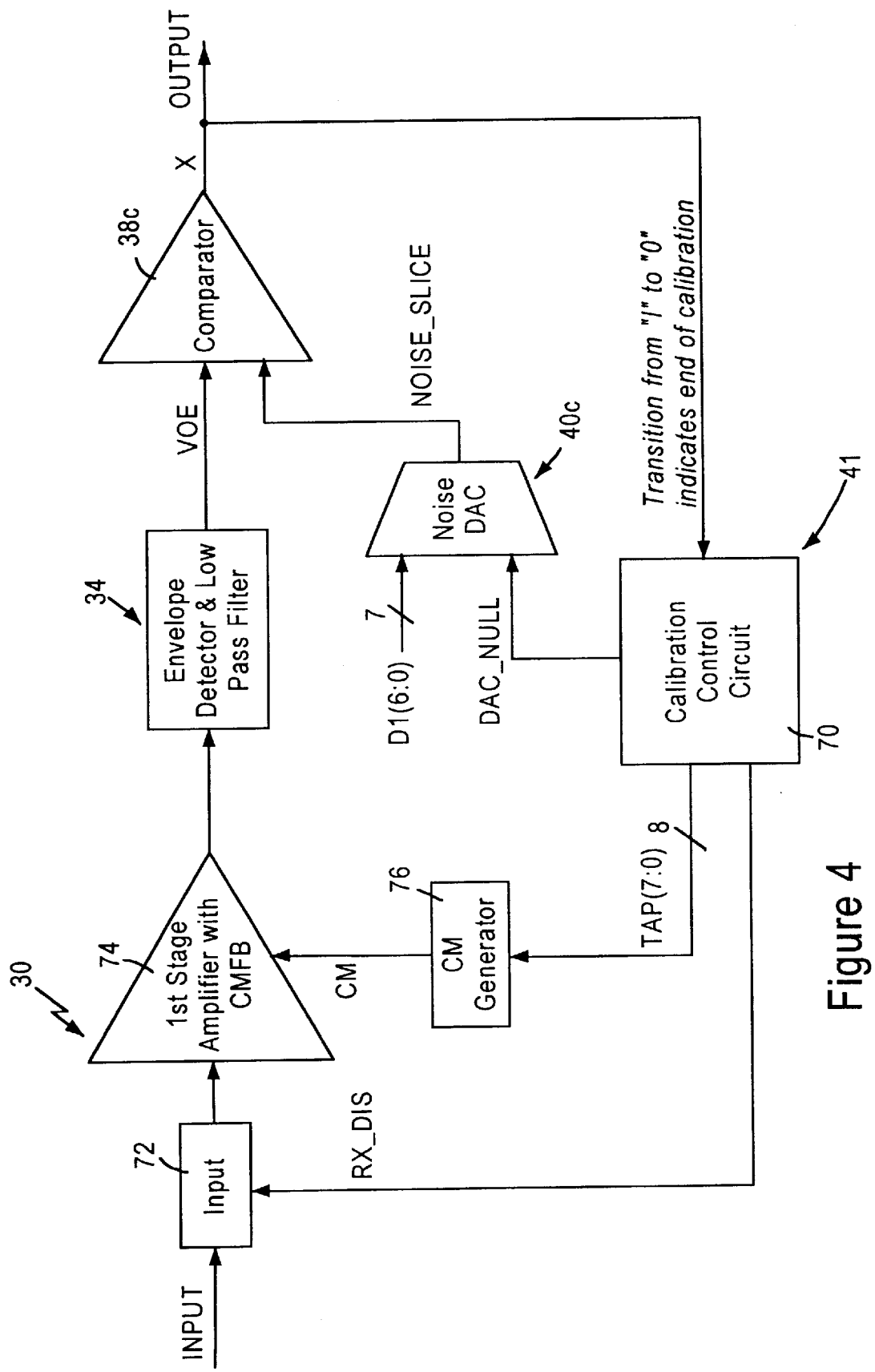
FIG. 4 is a block diagram illustrating in detail the calibration circuit implemented in the physical layer transceiver of FIG. 3 according to an embodiment of the present invention.

FIG. 4 is a diagram illustrating in detail a calibration circuit configured for calibrating the receiver circuitry of the physical layer transceiver 20 according to an embodiment of the present invention. As described above, the network 10 operating at a speed of 1 Mb/s over telephone line media 14 requires detection of incoming differential signals as small as 10 millivolts peak at 7.5 MHz. The incoming network signal is amplified, and the envelope signal is then obtained and supplied to the slicer circuits 38. The required amplitude for the envelope with the smallest incoming signal is approximately 100 millivolts.

As describe above, the envelope signal output by the envelope detector 34 (VOE) is compared to a noise slice level by the comparator 38c. The noise slice level sets the noise floor, while the peak slice level (P) sets the maximum amplitude of VOE. The data slice level (D) is between the two slice levels. The D to A converter 40c has a range of about $V_{DD}/2$ to $V_{DD}$ with a resolution of $1.65/2^7=12.9$ millivolts. A nominal slice level for the noise DAC 40c is 03 hexadecimal, corresponding to 38.7 millivolts above the DAC base of 00 hexadecimal. A problem may arise in signal detection if the base of the VOE signal (i.e., the minimum base line voltage of the envelope signal) has an offset relative to the base of the noise DAC 40c. For example, if the noise DAC slice level (NOISE_SLICE) supplied to the comparator to the 38c is greater than the maximum amplitude of the envelope signal VOE, then no signal can be detected. Conversely, if the noise DAC slice level (NOISE_SLICE) supplied to the comparator 38c is less than the base of the VOE signal, then the noise signal erroneously detects the presence of a network signal, even through there is no actual network signal received by the physical layer transceiver 20.

The disclosed embodiment provides a calibration arrangement designed adjust the VOE base to always be lower than the baseline value of the noise DAC 40c by at most 20 millivolts. The maximum of 20 millivolt offset between the two base voltages, plus 100 millivolt maximum amplitude for the envelope signal, is sufficient to detect the smallest network signal at 10 millivolts.

As shown in FIG. 4, the physical layer transceiver 20 includes a calibration control circuit 70, which is preferably implemented as part of the digital controller 41. The amplifier 30 includes an input circuit 72, and a first stage amplifier 74. The physical layer transceiver 20 also includes a common mode signal generator 76 configured for selectively generating a common mode voltage signal (CM) in response to a common mode selection signal (TAP(7:0)). The input circuit 72 selectively isolates the network signals received from the telephone line medium based on a disable signal (RX_DIS) output by the calibration control circuit 70. As described below, the calibration control circuit 70 outputs the disable signal (RX_DIS=1) during the calibration interval, insuring that the physical layer transceiver 20 is calibrated relative to the common mode voltage signal CM.

As described below, the common mode signal generator 76 selectively generates a common mode voltage signal (CM) in response to the 8-bit common mode selection signal. In particular, the common mode signal generator 76 has seven (7) predetermined DC voltage settings for the common mode voltage signal CM, where each voltage setting has a voltage differential of about 20 millivolts relative to an adjacent setting, providing a calibration range of 140 millivolts by the generator 76.

As described below, any input signal output from the input circuit 72 is amplified by the amplifier 74. The amplifier 74 provides a common-mode feedback loop which is set by the common-mode voltage signal CM. The common mode feedback sets the overall base voltage for the input signal supplied from the circuit 72. The common mode generator 76 thus sets the common mode voltage for the first stage amplifier 74 and the envelope detector 34. According to the disclosed embodiment, the common mode signal generator 76 has a range of about 1.7 volts to about 1.56 volts.

As described below, calibration is performed by initially setting the input circuit 72 to isolate the network signal from the amplifier 74, and then setting the common mode voltage signal CM to an initial maximum value. The common mode voltage signal CM is then supplied as a DC reference signal to the comparator 38c and compared to a minimum slice threshold. The initial maximum of the common mode voltage signal effectively sets the base of the envelope signal to a maximum voltage. If the maximum common mode voltage signal is less than the noise slice level, the comparator 38c logically transitions from a one (X=1) to a zero (X=0), causing the calibration control circuit 70 to store the corresponding configuration value of the common mode generator 76 as the calibrated value. If the initial maximum value of the common mode voltage signal (CM) does not fall below the minimum noise slice threshold level (NOISE_SLICE), the common mode voltage signal (CM) is successively reduced until the calibration control circuit 70 detects a transition from a 1 to 0 from the comparator 38c.

Hence, the calibration control circuit 70 determines an optimum calibrated value based upon the transition of the common mode voltage signal falling below the minimum noise slice level. The calibrated value can then be used as an ideal offset value that compensates for any process variations within the physical layer transceiver circuitry, and insures that the baseline value for the envelope signal during normal operation is within 20 millivolts underneath the minimal noise slice threshold level.

Figure 5:
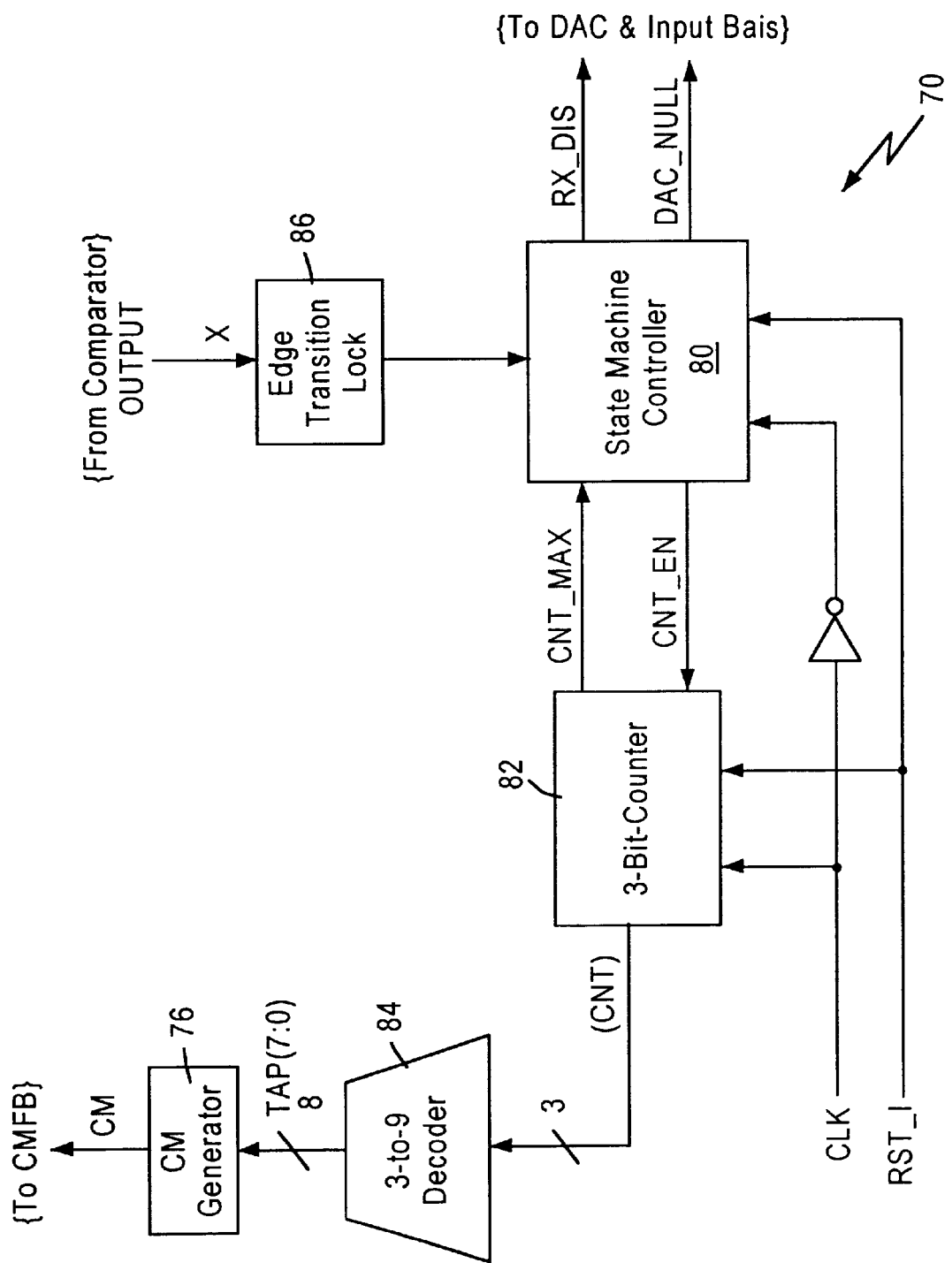
FIG. 5 is a block diagram of illustrating in further detail the calibration circuit of FIG. 4.

FIG. 5 is a diagram illustrating in further detail the calibration control circuit 70 of FIG. 4. The calibration control circuit 70 includes a state machine controller 80, a 3-bit counter 82, and a decoder 84. The calibration control circuit 70 also includes an edge transition lock circuit 86 configured for locking a detected transition from X=1 to X=0 from the noise comparison signal output by the comparator 38c. The edge transition lock circuit 86 locks the first edge transition to a prescribed interval, preventing oscillations, due to transitions by may occur at the threshold level in a noisy environment. The 3-bit counter 82 is reset to zero by a system reset signal (RST_L), and initiates incrementing of an internal count value each clock cycle upon assertion of an enable signal (CNT_EN) output from the state machine controller 80. The count value (CNT) is output to the decoder 84, which asserts one of the 8 selection lines (TAP(7:0)) to the common mode signal generator 76 based upon the count value. If the counter 82 reaches a maximum count value of 7, the counter 82 outputs a maximum count signal (CNT_MAX) to the state machine controller 80.

Operation of the calibration control circuit 70 will now be described with respect to FIGS. 6 and 7.

Figure 6:
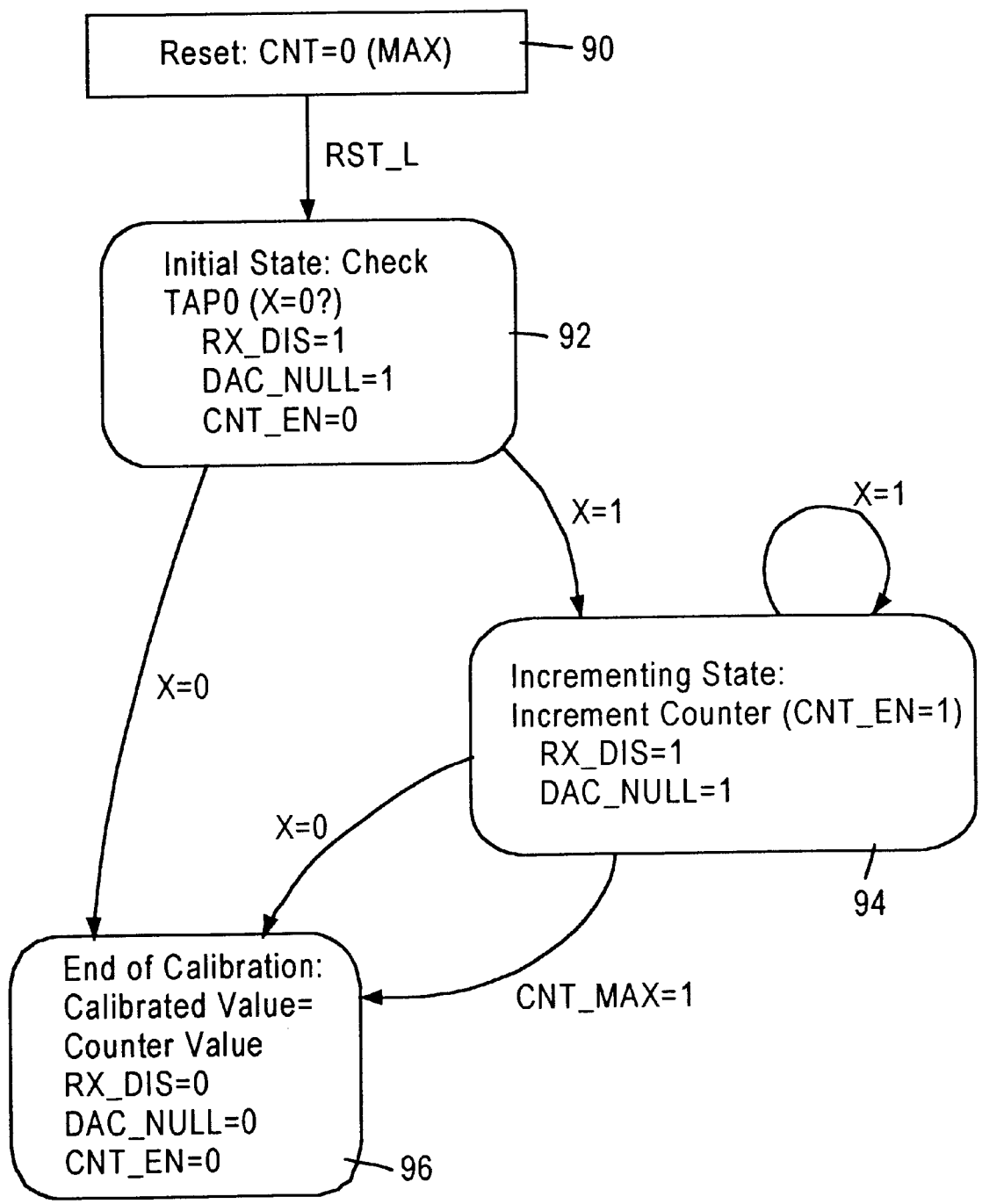
FIG. 6 is a state diagram illustrating the operation of the state machine controller of FIG. 5.

FIG. 6 is a state diagram illustrating the operation of the state machine controller 80. FIG. 7 is diagram illustrating the signals generated by the physical layer transceiver 20 during the calibration process. The method begins in step 90 where a reset state is initiated by the network station 12, for example during turn-on or during initialization of the network 10.

The reset state 90 has a duration of at least 50 microseconds to enable the circuits of the physical layer transceiver 20 to stabilize. As shown in FIGS. 5 and 6, the reset signal (RST_L) causes the counter 82 to be reset to zero, which corresponds to a maximum common mode voltage signal in the common mode signal generator 76. The state machine controller 80 then enters an initial state 92, and outputs the disable signal to the input bias circuit 72 to isolate any incoming network signals from the physical layer transceiver 20 (RX_DIS=1). The state machine controller 80 also generates a null signal to the noise DAC 40c (DAC_NULL=1), causing the noise DAC 40c to output a noise slice level having a minimum threshold value 98, shown in FIG. 7. The state machine controller 80 also outputs a deasserted counter enable signal (CNT_EN=0), holding the three-bit counter 82 to the zero count value. As shown in FIG. 7, the common mode voltage signal is set to an initial maximum value 100, causing the first stage amplifier 74 and the envelope detector 34 to output an "envelope" signal (VOE) 102 that substantially corresponds to the CM signal. The state machine controller checks in state 92 where the initial maximum value of common mode voltage signal (TAP 0) causes the comparator 38c to output a zero (X=0). As shown in FIG. 7, the voltage signal 102 has a value exceeding the noise slice level 98, such that the comparison results equals 1 (X=1).

Figure 7:
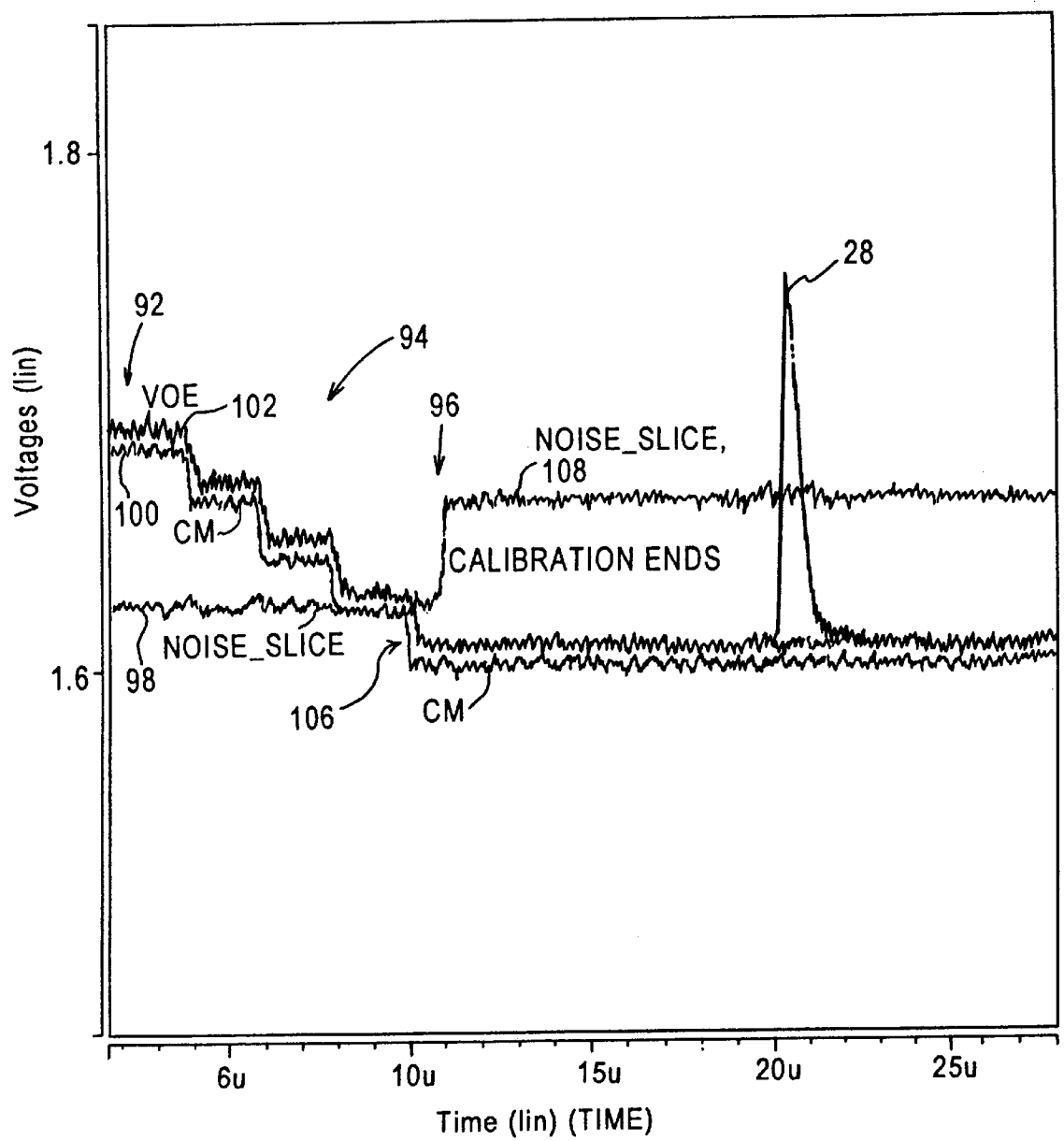
FIG. 7 is a signal diagram illustrating the operation of the calibration circuit of FIG. 4.

As shown in FIG. 7, the VOE signal 102 output by the envelope detector and low pass filter 34 closely follows the common mode voltage signal 100, since the amplifier 74 and the detector 34 has no other input signal due to the isolation by the input circuit 72. Hence, the noise comparator 38c effectively compares the common mode voltage signal 100 to the noise threshold (NOISE_SLICE). As shown in FIG. 7, the VOE signal 102 is greater than the noise slice level 98, hence the comparator result X=1.

The state machine controller 80 moves from state 92 to state 94 in response to the noise comparison signal being equal to 1 (X=1). The state machine controller 80 in state 94 begins incrementing the count value (CNT) in the counter 82 by asserting the count enable signal (CNT_EN=1). The state machine controller also continues asserting the disable signal (RX_DIS=1) to the input circuit 72 and the null signal (DAC_NULL=1) to the digital to analog converter 40c, causing the DAC 40c to output the minimum noise threshold level to the comparator 38c. The counter 82 increments each clock cycle while the enable signal (CNT_EN) is asserted. The decoder 84 decodes the incremented count value, causing assertion of another unique selection signal (e.g., TAP 1) for selection of another one of the bias voltage settings in the common mode signal generator 76. Hence, the incrementing of the count value (CNT) results in a corresponding decrease in the common mode voltage signal (CM).

The state machine controller 80 continues to successively increment the 3-bit counter 82 in response to detecting that the common mode voltage signal CM is greater than the prescribed noise threshold (NOISE_SLICE) 98, indicated by the comparator output X=1. As shown in FIG. 7, the common mode voltage CM is successively reduced by a predetermined voltage (e.g., 20 millivolts) for a prescribed interval (e.g., 2 microseconds) until the common mode voltage signal CM falls below the noise threshold level 98 at event 106. The comparator 38c outputs a comparison result of X=0 based on the common mode voltage signal CM, output as the VOE signal 102, falling below the prescribed noise slice threshold 98.

The state machine controller 80 moves to the end of calibration state 96 in response to the comparsion result (X=0) indicating that the common voltage signal 100 falls below the prescribed noise threshold (NOISE_SLICE) 98 at event 106. The state machine controller 80 deasserts the count enable signal (CNT_EN=0), which sets the common mode voltage signal CM to a calibrated value based on holding of the count value (CNT) in response to the detected transition in the comparator output. If desired, the state machine controller 80 may store the count value corresponding to event 106 in an internal register (not shown). The state machine controller 80 also deasserts the null signal (DAC_NULL=0), enabling the digital to analog converter 40c output a new noise slice threshold signal 108 that is responsive to the data input signal (DI) from the digital controller 41. The disable signal is also deasserted (RX_DIS=0), causing the input circuit 72 to supply the received network signals to the amplifier 74 and the envelope detector 34, causing generation of the envelope signal 28 as described above.

As shown in FIG. 7, the common mode voltage signal CM falls below the noise slice threshold 98 at event 106, causing the comparison result X to transition from 1 to 0 resulting the transition in the state machine controller 80 from state 94 to state 96. However, if the common mode signal CM and the noise level 98 share relative positions such that continued incrementing of the three-bit counter 82 does not cause the common mode voltage signal CM to fall below the noise slice level 98, then the counter 82 will output a count max signal (CNT_MAX) upon reaching the prescribed maximum count value of 7. In response to assertion of the count max signal (CNT_MAX), the state machine controller 80 moves from state 94 to state 96 to end calibration and uses the maximum count value for the calibrated value of the common mode voltage generator 76, resulting in the common mode voltage generator outputting the minimum value for the CM signal.

Hence, the calibration control circuit 70 determines an optimum calibration position for the common mode voltage signal relative to the minimum noise slice threshold. As a result, the receiver circuitry is configured to maintain the baseline of the envelope (VOE) signal to within about 20 millivolts under the minimum noise slice threshold, ensuring sensitivity and accuracy in the receiver portion including the amplifier 30, the detector 34, and the slicers 38.

Figure 8:
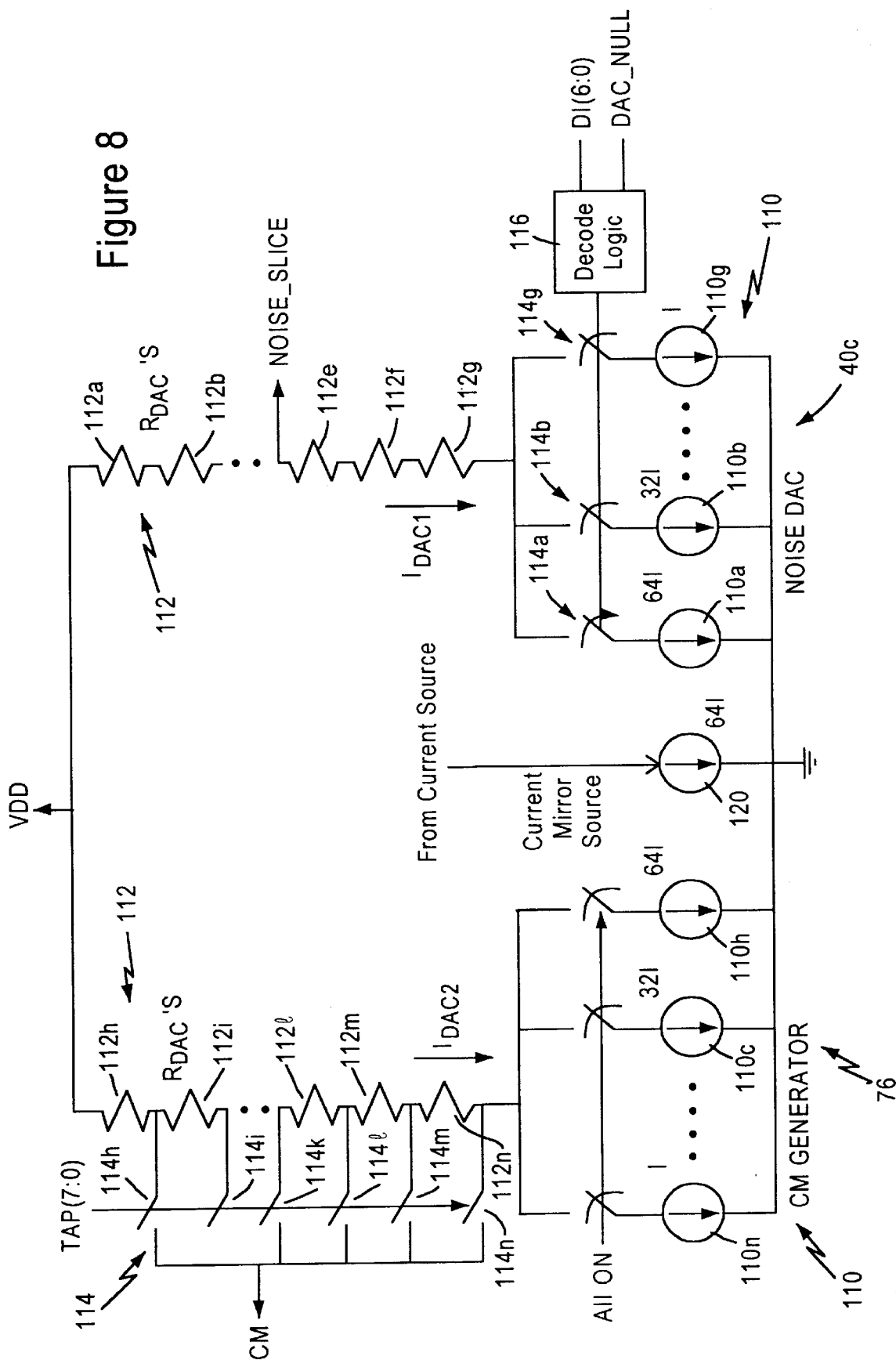
FIG. 8 is a diagram illustrating in detail the noise DAC and the common mode signal generator of FIG. 4 according to an embodiment of the present invention.

FIG. 8 is a circuit diagram illustrating the common mode voltage signal generator 76 and the noise threshold digital to analog converter 40c according to an embodiment of the present invention. As shown in FIG. 8, the common mode voltage signal generator 76 and the noise DAC 40c are configured to have the same circuit structure. Hence, the common mode voltage signal generator 76 and the noise DAC 40c have matching circuit design and layout, enabling the signal outputs CM and NOISE_SLICE to track each other closely.

As shown in FIG. 8, the noise DAC 40c includes a first group of seven (7) binary-weighted current sources 110 (110a through 110g), a second group of seven resistors 112 (112a through 112g) having a prescribed resistance ($R_{DAC}$), and a group of switches 114a through 114g. The switches 114a through 114g, preferably implemented as MOS transistors, are controlled by decoding logic 116 based on the digital input value (DI), and the null signal (DAC_NULL). The switchable binary-weighted current sources drive the current ($I_{DAC1}$) to the corresponding resistors 112, referenced to the voltage supply $V_{DD}$. Assertion of the null signal, (DAC_NULL) causes the decode logic 116 to close all the switches 114, causing a current drop $I_{DAC1}$ of 127I across the resistors 112, resulting a minimum voltage value for the noise threshold signal (NOISE_SLICE). Hence, the noise DAC 40c is implemented as a current steering-type digital to analog converter.

The common mode voltage signal generator 76 includes another group of resistors 112 (112h through 112n), a second set of the current sources 110 (110h through 110n), and a set of switches 114 (114h through 114n) configured for controlling the group of resistors 112h through 112n. Each resistor 112h through 112n corresponds to a voltage drop of about 20 millivolts based on a current draw of $I_{DAC2}=127I$. As shown in FIG. 8, each switch 114h through 114n is controlled by the output signals (TAP) from the decoder 84 of FIG. 5.

Hence, the noise DAC 40c and the common mode voltage signal generator 76 are implemented using the same circuit structure and layout, where the current sources 110 are driven by a current mirror source 120. Hence, the noise slice level output by the noise DAC 40c will closely correlate the common voltage signal (CM) output by the generator 76.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method of calibrating a physical layer transceiver configured for receiving network signals from a telephone line medium, the method comprising:
   generating in a common mode voltage generator a common mode voltage signal having an initial maximum value;
   supplying the common mode voltage signal to a receiver circuit configured for processing the network signals from the telephone line medium according to the common mode voltage signal, the receiver circuit including a noise comparator configured for generating a noise comparison signal based on an input signal exceeding a prescribed noise threshold;
   determining a presence of an event where the common mode voltage signal falls below the prescribed noise threshold as the input signal; and
   selectively setting the common mode voltage signal to a calibrated value based on the determined presence of the event.

2. The method of claim 1, wherein the determining step comprises:
   first determining whether the common mode voltage signal having the initial maximum value falls below the prescribed noise threshold; and
   if the initial maximum value does not fall below the prescribed noise threshold:
      (1) reducing the common mode voltage signal by a prescribed value, and
      (2) second determining whether the reduced common mode voltage signal falls below the prescribed noise threshold.

3. The method of claim 2, wherein the reducing step includes successively reducing the common voltage signal by the prescribed value if the corresponding reduced common mode voltage signal does not fall below the prescribed noise threshold.

4. The method of claim 3, wherein the reducing step includes selecting one of a plurality of predetermined bias voltage settings in the common mode voltage generator as the corresponding reduced common mode voltage signal.

5. The method of claim 4, wherein the selectively setting step includes selecting one of the predetermined bias voltage settings as corresponding to the calibrated value.

6. The method of claim 4, wherein the determining step further comprises selecting a minimum of the predetermined bias voltage settings as the calibrated value based on a determined absence of the event for any of the predetermined bias voltage settings.

7. The method of claim 1, wherein the supplying step includes:
   isolating the network signals from the receiver circuit during calibration; and
   processing the common mode voltage signal as the input signal.

8. The method of claim 1, wherein the generating step comprises:
   resetting a counter configured for counting a count value up to a predetermined number; and
   selecting one of a plurality of bias voltage settings based on the count value.

9. The method of claim 8, wherein the determining step includes incrementing the counter for a prescribed time interval until the determined presence of the event.

10. The method of claim 9, wherein the selectively setting step comprises setting the calibrated value to the count value output by the counter upon detection of the event.

11. The method of claim 10, wherein the selectively setting step further comprises setting the calibrated value to the predetermined number based on the counter counting up to the predetermined number and a determined absence of the event.

12. The method of claim 8, wherein the voltage gain settings each have a relative difference of a prescribed voltage, the selectively setting step including setting the calibrated value to equal the initial maximum value minus a product of the relative difference of the prescribed voltage and an identified count value corresponding to the event.

13. A physical layer transceiver configured for receiving network signals from a telephone line, comprising:
   a digital to analog (D/A) converter for selectively generating a noise threshold signal based on a supplied threshold value;
   a common mode signal generator for selectively generating a common mode voltage signal in response to a common mode selection signal;
   a receiver circuit configured for processing network signals from the telephone line medium according to the common mode voltage signal, the receiver circuit including a noise comparator configured for generating a noise comparison signal in response to an input signal exceeding the noise threshold signal; and
   a calibration control circuit configured for determining a calibration setting for the common mode signal generator based on the noise comparison signal, the calibration circuit setting the common mode selection signal to an initial maximum setting and selectively reducing the common mode selection signal to the calibration setting based on a determined presence of a transition in the noise comparison signal relative to the minimum noise threshold signal.

14. The physical layer transceiver of claim 13, further comprising an input circuit for selectively isolating the network signals from the receiver circuit based on a disable signal from the calibration control circuit during the determination of the calibration setting, the input signal being generated substantially based on the common mode voltage signal.

15. The physical layer transceiver of claim 13, wherein the calibration control circuit includes:

a counter for counting a count value up to a predetermined number in response to a clock signal, a system reset signal, and an enable signal; and a state machine controller for supplying the enable signal a prescribed time interval following the system reset signal, the state machine controller configured for identifying the calibration setting based on the detection of the transition a determined number of clock cycles following the output of the enable signal.

16. The physical layer transceiver of claim 15, wherein the calibration control circuit further is includes an edge transition lock circuit for locking the transition in the noise comparison signal.

17. The physical layer transceiver of claim 15, wherein the counter outputs a maximum count signal to the state machine controller in response to the count value reaching the predetermined number, the state machine controller setting the calibration setting to a minimum setting in response to the maximum count signal.

18. The physical layer transceiver of claim 13, wherein:

the D/A converter comprises a first group of current sources, a second group of resistors, and a third group of switches configured for controlling connection of the first group of current sources, respectively, to the second group of resistors based on the threshold value; and the common mode signal generator comprises a fourth group of said current sources, a fifth group of said resistors, and a sixth group of switches configured for controlling connection of the fifth group resistors, respectively, to the fourth group of current sources based on the common mode selection signal.

19. The physical layer transceiver of claim 18, wherein the common mode signal generator provides a calibration range of about 140 mV.

20. The physical layer transceiver of claim 19, where each of the sixth group of switches controls a voltage differential of about 20 mV.

21. The physical layer transceiver of claim 13, wherein the calibration control circuit successively reduces the common mode selection signal by intervals of about 20 mV.

\* \* \* \* \*